United States Patent [19]

Fahlgren

[11] 4,030,039
[45] June 14, 1977

[54] FUNCTION GENERATOR

[75] Inventor: Tord Fahlgren, Kolback, Sweden

[73] Assignee: ASEA Aktiebolag, Vasteras, Sweden

[22] Filed: Mar. 17, 1976

[21] Appl. No.: 667,703

[30] Foreign Application Priority Data

Apr. 1, 1975 Sweden .......................... 7503674

[52] U.S. Cl. .................... 328/142; 307/229; 235/194; 328/143
[51] Int. Cl.² ................................ G06G 7/12
[58] Field of Search .......... 307/229, 230; 328/142, 328/143; 235/197

[56] References Cited

UNITED STATES PATENTS

| | | | |
|---|---|---|---|
| 3,550,020 | 12/1970 | Gill et al. | 328/142 |
| 3,560,727 | 2/1971 | Schussler | 235/197 |
| 3,622,770 | 11/1971 | Edelson | 235/197 |
| 3,644,836 | 2/1972 | Johnson | 328/143 |
| 3,736,515 | 5/1973 | Kadron et al. | 328/143 |
| 3,737,642 | 6/1973 | Kulas | 235/197 |
| 3,757,234 | 9/1973 | Ohlson | 328/142 |
| 3,895,224 | 7/1975 | Spratt et al. | 235/197 |
| 3,962,648 | 6/1976 | Watson, Jr. | 328/142 |

Primary Examiner—Stanley D. Miller, Jr.
Attorney, Agent, or Firm—Watson Cole Grindle & Watson

[57] ABSTRACT

For the generation of inverse time characteristics for time-lag type over-current relays or the like, by approximation of the time function by means of individual, linear parts into a time function which is discontinuous at a number of break points. A plurality of amplifier circuits corresponding to the number of break points in the approximated time function each has at least one input and at least one output and operates as an ideal diode. The input of each of the amplifier circuits is connected to an input voltage source. An arrangement is provided for selectively connecting the output of each of the amplifier circuits to the input or output of the operational amplifier, depending on whether the linear part of the time function, determined by a selected amplifier circuit, has a greater or smaller derivative than the preceding linear part of the time function.

3 Claims, 1 Drawing Figure

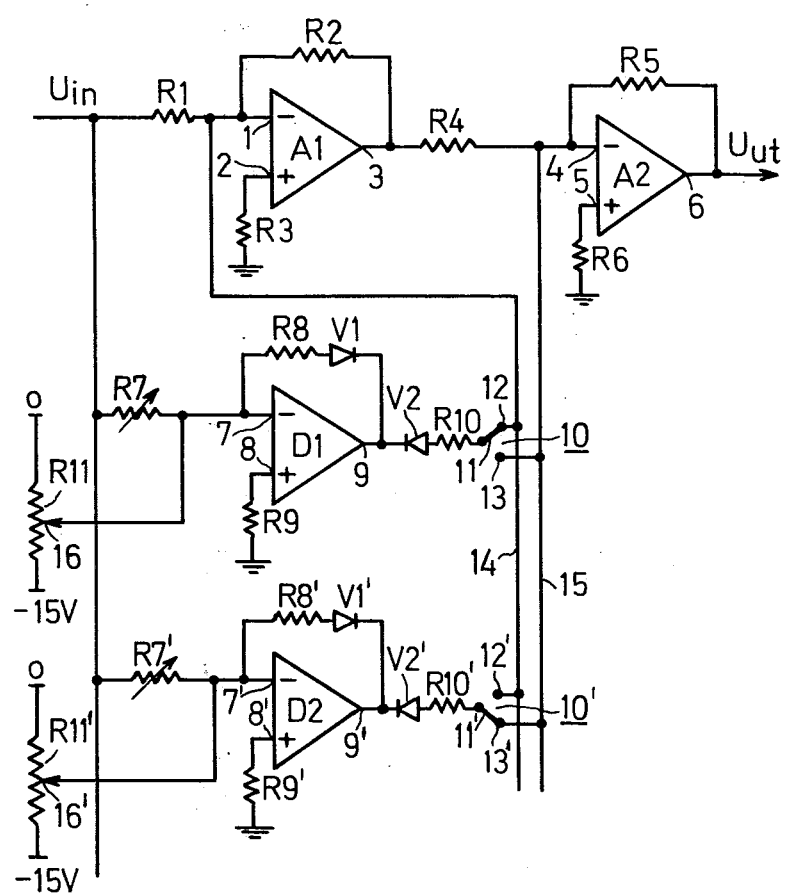

FUNCTION GENERATOR

BACKGROUND OF THE INVENTION

1. Field of the Invention

For generation of inverse time characteristics for, for example, time-lag type over-current relays, it is known to approximate a desired time function by means of individual parts which are linear in pieces. These parts are linked together in break points and, by altering the inclination of the curve part located between two break points, the composite time function can be given its desired shape. This approximation of a desired time function is usually performed with a diode matrix in combination with an integrating circuit. The diodes included are given varying bias by means of a voltage divider in order that the positions of the desired break points may be obtained.

2. The Prior Art

This method has two disadvantages. One is that the current-voltage characteristic of the diode is not ideal, but the voltage drop across the doide is dependent on the current through the diode. The other disadvantage is that the diode voltage drop is strongly dependent on the temperature.

SUMMARY OF THE INVENTION

The present invention relates to a function generator for generating inverse time characteristics for, for example, time-lag-type over-current relays by approximating the time function by means of individual straight parts which are put together to a time function being discontinuous in a number of break points. Besides the integrating circuit, which will not be further described, the function generator comprises an operational amplifier with at least one input and one output and a number of amplifier circuits, known per se and corresponding to the number of break points in the approximated time function, said amplifier circuits having at least one input and one output and each one operating as a diode with ideal characteristics.

According to the invention, the input of each of the amplifier circuits is connected to an input voltage source. An arrangement is provided for selectively connecting the output of each of the amplifier circuits to the input or output of the operational amplifier, depending on whether the linear part of the time function, determined by a selected amplifier circuit, has a greater or smaller derivative than the preceding linear part of the time function.

By using ideal diodes, that is diode connections which in their function are both current and temperature-independent, for generating the individual curve parts, the function generator will become temperature- and current-independent. An alteration in the derivative of the approximated time function in various areas of the function can be easily obtained by changing the connections of the amplifier circuits used to the operational amplifier.

BRIEF DESCRIPTION OF THE DRAWINGS

The accompanying drawing shows an example of how a function generator according to the invention may be built.

DESCRIPTION OF THE PREFERRED EMBODIMENTS

A conventional operational amplifier A1 is supplied with the input voltage $U_{in}$ over a resistor R1 to the inverted input 1 of the amplifier. The second input 2 of the amplifier is connected to ground by resistor R3. A resistor R2 is positioned between the first-mentioned input of the amplifier and its output 3. This output is connected, by resistor R4, to the inverted input 4 of a second operational amplifier A2, the second input 5 of which is connected to ground through resistor R6. The first input 4 of the amplifier A2 and its output 6 are connected by means of a resistor R5. The output signal $U_{ut}$ of the function generator appears at output 6.

In order to achieve the desired approximated time function, a number of amplifier circuits are used, corresponding to the number of break points in the function, each of the amplifier circuits operating as a biased ideal diode. The figure shows the use of two such circuits D1 and D2, but the number of circuits is optional.

The circuitry associated with each of the amplifier circuits D1 and D2 are identical to each other and the components of the circuitry associated with amplifier circuit D2 have been designated with primed legends. Because the structure of amplifier circuits D1 and D2 and their respective associated circuitry are identical, the following description is taken only with respect to amplifier circuit D1 and its associated circuitry.

Amplifier circuit D1 has an inverted input 7, which is connected to the input voltage $U_{in}$ by resistor R7. The input is connected to the output 9 by resistor R8 and a diode V1. The second input 8 is connected to ground by resistor R9. The output 9 is connected, by diode V2 and a resistor R10, to a switch 10, the movable contact 11 of which can be connected to either of two fixed contacts 12, 13. The fixed contact 12 is connected to the input 1 of the operational amplifier A1 by means of a conductor 14. The second fixed contact 13 is connected to the input 4 of the operational amplifier A2 by means of a conductor 15. Amplifier circuit D1 has its input 7 connected to the movable contact 16 of a potentiometer R11, the ends of which are connected to 0 or 15 volts, respectively.

With respect to amplifier circuits D1 and D2, the break points between the linear parts of the approximated function are set by means of the potentiometers R11, R11'. This means that the contacts 16, 16' have different positions in the different potentiometers. The inclination of the linear parts is determined by the resistors R7, R7' which thus have different values for each amplifier circuit D1, D2, and so on. An adjustment of the inclination of a function part, which is performed by each resistor R7, R7' is not affected by the setting of the break points, which is performed by the potentiometers R11, R11'. This has the advantage that, when several break points are used, previously adjusted parts of the function are not influenced when a functional part is trimmed.

The following description is taken again only with respect to amplifier circuit D1 and its associated circuitry.

As long as the voltage on the inverted input 7 of the amplifier connection D1, D2 is negative, the connection develops full positive output voltage. In this position both diodes V1 and V2 are blocking. When $U_{in}$ increases so that the potential on the input 7 passes through 0, D1 starts emitting a negative output signal, and the potential on the input 7 remains at 0 since the output signal is regenerated through resistor R8 and diode V1. This means that the voltage across resistor R8, diode V1 becomes equal to the voltage across resistor R10, and diode V2. If the resistance of resistor R8 is chosen to be equal to that of resistor R11 and diode V1 is equivalent to diode V2, an equally great current will pass through both the diodes.

If the movable contact of the switch 10 is connected to the fixed contact 12, as in the case of D1, part of the current which passes through R1 will be shunted away through R10, V2, and the voltage $U_{ut}$ acquires a derivative which decreases when $U_{in}$ exceeds the break point for D1 set on the potentiometer R11. If, instead, the switch 10 is set in its second position, as in the case of the circuit D2, a greater current will pass through R1 and R4 and the voltage $U_{ut}$ will have an increasing derivative.

If the input 7 of the amplifier circuits D1, D2 is regarded as very highly-ohmic in relation to outside resistances, the current through the connections will become $I = U_{in}/R7$. This means that the current-voltage characteristics of the diodes and their temperature dependence will not influence the operation of the function generator. The amplifier circuits D1, D2 operate as ideal diodes and are independent of current and temperature.

I claim:

1. Function generator for generation of inverse time characteristics by approximation of the time function by means of individual, linear parts into a time function which is discontinuous at a number of break points, comprising first and second operational amplifiers, each having at least one input and at least one output the output of said first operational amplifier being connected to the input of said second operational amplifier, a plurality of amplifier circuits corresponding to the number of break points in the approximated time function, each of said amplifier circuits having at least one input and one output and operating as an ideal diode to provide a predetermined linear part of said time function, each of said amplifier circuits having said input connected to an input voltage source, and each of said amplifier circuits including selecting means for independently connecting the output thereof to the input of said first operational amplifier to decrease the derivative of the linear part of the time function generated by the respective amplifier circuit, said selecting means alternatively connecting the amplifier circuit output to the input of said second operational amplifier to increase the derivative of the linear part of the time function generated by the respective amplifier circuit.

2. A function generator according to claim 1, said selecting means comprising: a first conductor including a fixed contact for each of said amplifier circuits is connected to the input of said first operational amplifier, a second conductor including a fixed contact for each of said amplifier circuits is connected to the input of said second operational amplifier, and a switch with a movable contact connected to the output of the associated amplifier circuit and arranged to cooperate with said fixed contacts to alternatively connect the associated amplifier circuit to the input of one of said two operational amplifiers.

3. A function generator according to claim 1 wherein each of said amplifier circuits includes means for varying the break point at which the respective amplifier circuit is actuated and means for adjusting the slope of the linear portion of the time function controlled by the respective amplifier circuit, said means for varying and said means for adjusting being operated independently from each other.

* * * * *